(12) United States Patent
Nelson et al.

(10) Patent No.: US 7,261,495 B1
(45) Date of Patent: Aug. 28, 2007

(54) ASSEMBLY FOR RETAINING A CUTTING INSERT IN A POCKET OF A TOOL HOLDER

(75) Inventors: Joseph V. Nelson, Greensburg, PA (US); James R. Kasperik, Latrobe, PA (US); Timothy G. Friedline, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 11/358,625

(22) Filed: Feb. 21, 2006

(51) Int. Cl.
*B23B 29/04* (2006.01)

(52) U.S. Cl. ...................................... 407/105; 407/104

(58) Field of Classification Search ................ 407/105, 407/104, 95, 96, 103
See application file for complete search history.

(56) References Cited

U.S. PATENT DOCUMENTS

| | | | |
|---|---|---|---|
| 2,595,090 A | 4/1952 | Middleton | |
| 2,598,581 A | 5/1952 | McKenna et al. | |
| 2,968,859 A | 1/1961 | Garnett | |
| 3,137,918 A | 6/1964 | Breuning | |
| 3,341,923 A | 9/1967 | Kelm | |
| 3,456,315 A | 7/1969 | Stier | |
| 3,525,136 A | 8/1970 | Crosby | |
| 3,546,758 A | 12/1970 | Stier | |
| 3,787,941 A | 1/1974 | Novkov | |
| 3,792,517 A | 2/1974 | Gage | |
| 3,821,837 A | 7/1974 | Faber | |
| 3,838,500 A | 10/1974 | Wirfelt | |
| 3,854,138 A | 12/1974 | Roos | |
| 3,939,540 A | 2/1976 | Novak | |
| 3,996,651 A | 12/1976 | Heaton et al. | |
| 4,044,440 A * | 8/1977 | Stier | 407/105 |
| 4,204,781 A * | 5/1980 | Johann | 407/105 |
| 4,397,592 A * | 8/1983 | Erickson | 407/105 |
| 4,398,853 A * | 8/1983 | Erickson | 407/104 |
| 4,420,280 A | 12/1983 | Gustafson | |
| 4,427,322 A * | 1/1984 | Kroll | 407/105 |
| 4,477,212 A | 10/1984 | Kraft | |
| 4,487,533 A * | 12/1984 | Wermeister | 407/105 |
| 4,575,287 A | 3/1986 | Oshnock et al. | |
| 4,615,650 A * | 10/1986 | Hunt | 407/105 |
| 4,664,564 A | 5/1987 | Loqvist | |
| 4,697,963 A | 10/1987 | Luck | |
| 4,730,525 A | 3/1988 | Kelm | |
| 4,848,199 A | 7/1989 | Kelm | |
| 4,875,812 A * | 10/1989 | Haque et al. | 407/104 |
| 5,199,828 A * | 4/1993 | Forsberg et al. | 407/104 |
| 5,586,844 A | 12/1996 | Nyman | |

(Continued)

*Primary Examiner*—Willmon Fridie, Jr.
(74) *Attorney, Agent, or Firm*—Larry R. Meenan

(57) ABSTRACT

An assembly for retaining a cutting insert in a pocket of a tool holder includes a locking pin, a spring disposed in the bore of the tool holder, a locking plate disposed in the bore between the spring and the locking pin, and a set screw for retaining the assembly. The locking plate is biased against a ledge of the bore to cause the locking pin to draw and retain the cutting insert in a direction such that the cutting insert is held in a secured position against the pocket of the tool holder. To release the cutting insert, a force is applied to the assembly to counteract the biasing force of the spring. The locking pin or the locking plate may include a flat surface that cooperates with a flat surface on the bore to act as a key to proper orientate the assembly in the bore.

18 Claims, 7 Drawing Sheets

U.S. PATENT DOCUMENTS 6,158,928 A    12/2000  Hecht
6,409,435 B1    6/2002  Kocherovsky et al.
6,773,210 B2 *  8/2004  Erickson ..................... 407/102

* cited by examiner

ASSEMBLY FOR RETAINING A CUTTING INSERT IN A POCKET OF A TOOL HOLDER

BACKGROUND OF THE INVENTION

One problem encountered with conventional tool holders is that of holding the cutting insert securely in the pocket of the tool holder. At the beginning of a cutting operation, the sudden transition from no load to extreme pressure load on the insert can cause the insert to shift position in the holder and thereby affect the accuracy of the planned cut. At the end of the cutting operation, the sudden disengagement of the cutting insert from the workpiece causes the pressure load suddenly to be removed from the insert. This sudden change in load can cause the insert to shift and distress any repeatable dimensional accuracy, which is essential for most tool holders, especially cutting inserts used in Numerically Controlled machines, to meet.

During the cutting operation, loads of up to 35,000 pounds may be encountered on the cutting insert which, if the insert is not precisely located and firmly held in the holder to begin with, can also cause shifting of the insert during the cutting operation. It is, therefore, important to provide a tool holder that can precisely and securely seat a cutting insert and then securely hold the cutting insert in location during all phases of the heavy duty cutting operation.

When taking a heavy duty cut, such as described above, the efficiency of removing the metal from a workpiece is, thus, to be maximized. The rate of metal removal rate from a workpiece is, however, only one part of the efficiency factor. When using indexable cutting inserts, there comes a point in time when the cutting edge becomes worn and must be replaced with a fresh cutting edge.

To change a cutting edge, the cutting action must be stopped and the machine operator must index the cutting insert to a new cutting edge or replace the cutting insert altogether if all of the cutting edges thereof have become worn. The time it takes the operator to make this change directly affects the efficiency or metal removal rate of a particular machine.

The operator, having stopped the machine after some very heavy duty cutting, now has the situation that the insert the operator is about to change or index is extremely hot; in fact, too hot to be handled without gloves, rags, or other protection by the operator. Most gloves and other protection worn by the operator are cumbersome to them and, therefore, any system used for locating and seating a cutting insert in a tool holder, should recognize that a minimum of tools should be used at this point, or that if tools are used, they should be of sufficient size and utility to be used by the operator while using gloves or other protective equipment.

Most of the pin type holders of the prior art may be defective in that the pin-type clamp merely holds the insert down in the pocket without insuring that the insert is positioned or held back against one side wall of the pocket, or the pin-type holders mainly hold the insert back against a side wall of the pocket without holding the insert down in the pocket and, therefore, did not prevent fluttering of the insert during extreme operating conditions.

BRIEF SUMMARY OF THE INVENTION

The inventor(s) of the present invention have recognized these and other problems associated with conventional tool holders and have developed an assembly for retaining a cutting insert in a pocket of a tool holder including a bore having a ledge formed therein. The assembly comprises a locking pin at least partially disposed in one end of the bore of the tool holder; a spring disposed in the bore of the tool holder; a locking plate disposed in the bore of the tool holder between the spring and the locking pin; and a set screw at least partially disposed in an opposite end of the bore of the tool holder. The locking plate is biased against the ledge of the bore to cause the locking pin to draw and retain the cutting insert in a direction such that the cutting insert is held in a secured position against the pocket of the tool holder.

In another aspect of the invention, an assembly comprises a locking pin at least partially disposed in the bore of the tool holder; a locking plate disposed in the bore of the tool holder; and means for biasing the locking plate. The locking plate is biased against the ledge of the bore to cause the locking pin to draw and retain the cutting insert in a direction such that the cutting insert is held in a secured position against the pocket of the tool holder.

In yet another aspect of the invention, a tool holder including a bore having a ledge formed therein, comprises a locking pin at least partially disposed in the bore of the tool holder; a locking plate disposed in the bore of the tool holder; and a spring for biasing the locking plate. The locking plate is biased against the ledge of the bore to cause the locking pin to draw and retain the cutting insert in a direction such that the cutting insert is held in a secured position against the pocket of the tool holder.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
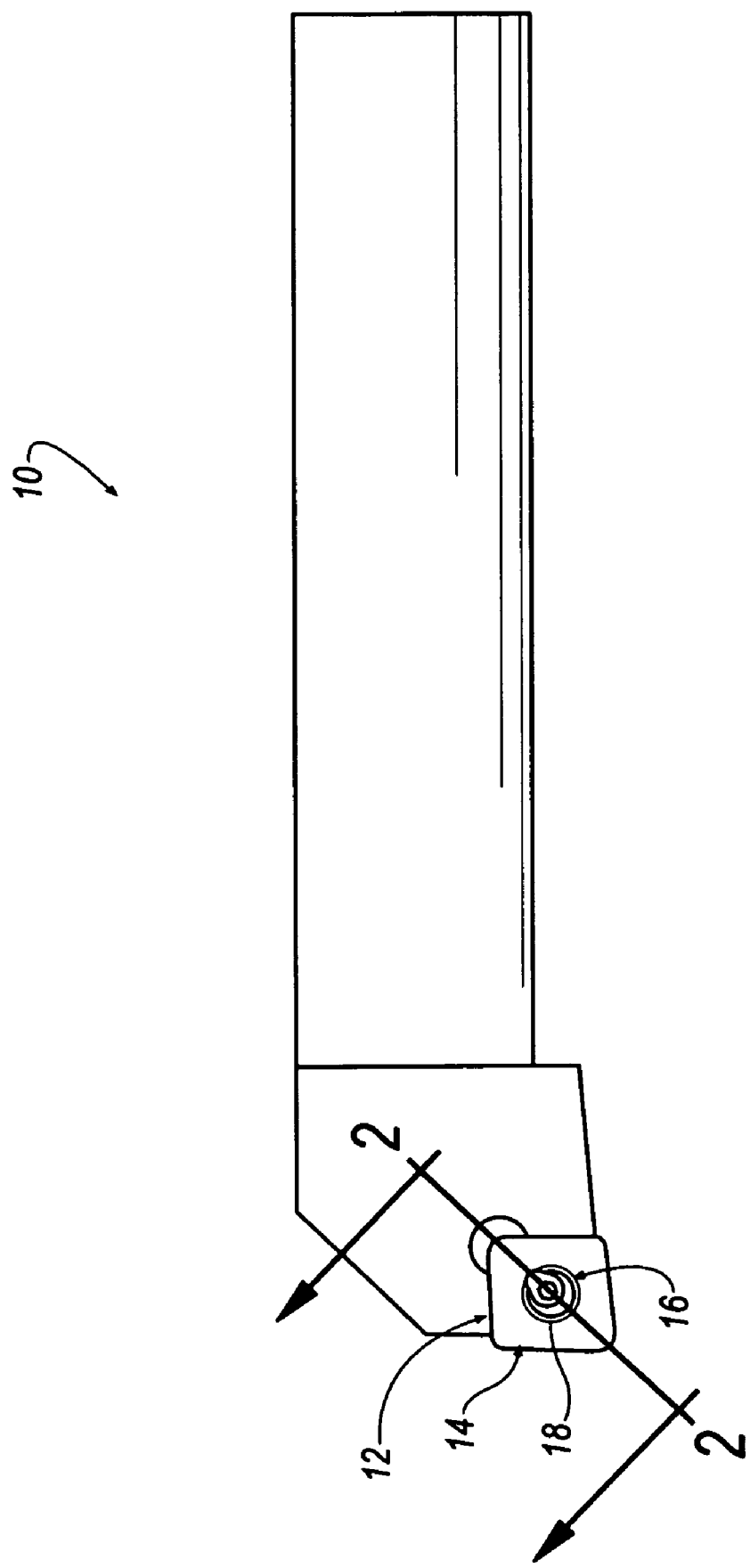
FIG. 1 is a plan view of a tool holder according to an embodiment of the invention with a cutting insert mounted thereon.

In general, the present invention is directed to an assembly for retaining a cutting insert through its apex by drawing the cutting insert against two walls of a pocket of a holding tool. As shown generally in FIG. 1, a tool holder 10 that has, at its forward end, an insert receiving pocket 12. An indexable cutting insert 14 is seated in the insert receiving pocket 12. An assembly, shown generally at 16, engages with a central hole or bore 18 in the cutting insert 14 and retains the cutting insert 14 securely in the pocket 12.

Figure 2:
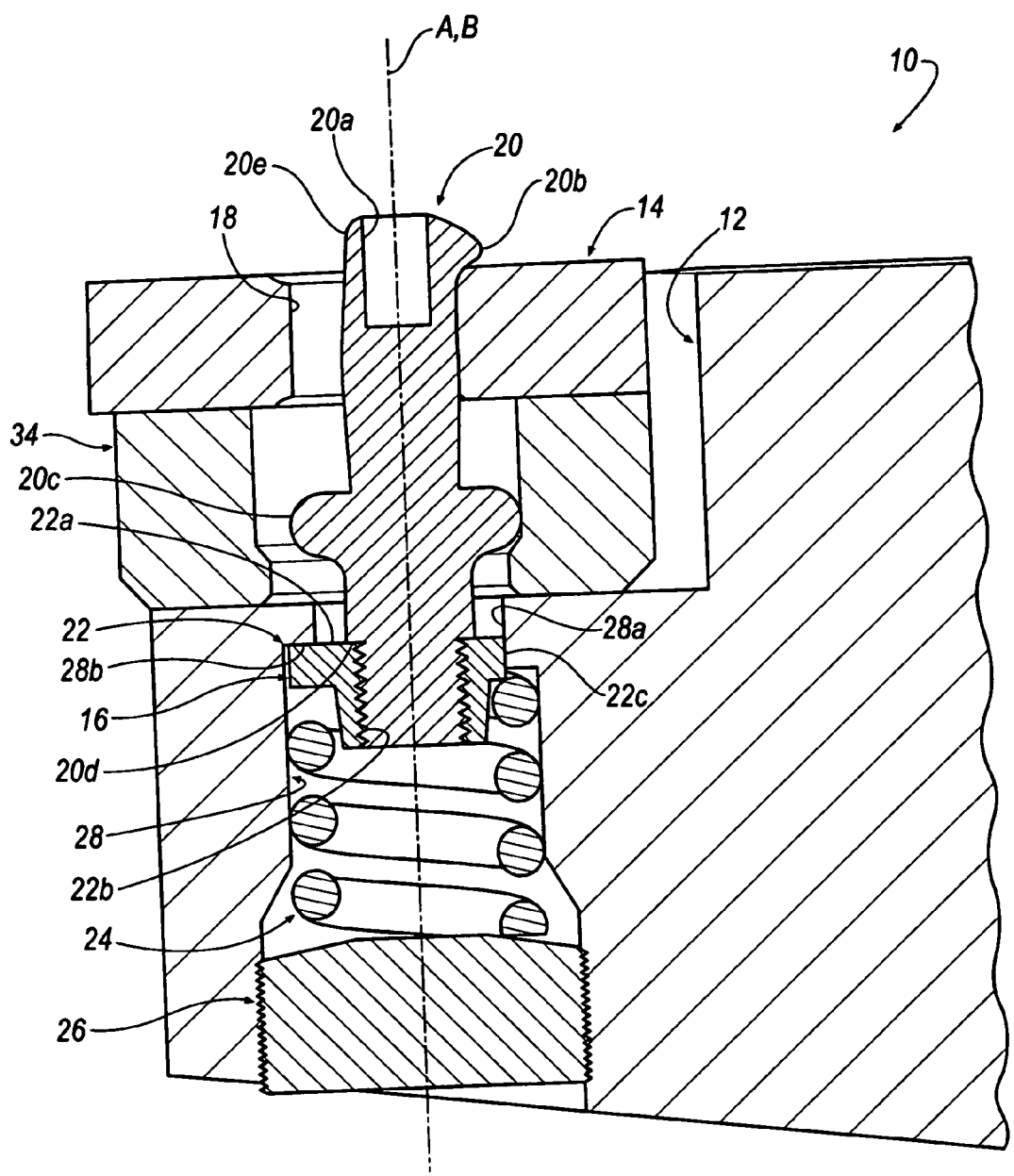
FIG. 2 is a cross-sectional view of the tool holder taken along line 2-2 of FIG. 1 and showing an assembly for retaining the cutting insert in the pocket of the tool holder in an unreleased or secured position according to an embodiment of the invention.
Figure 3:
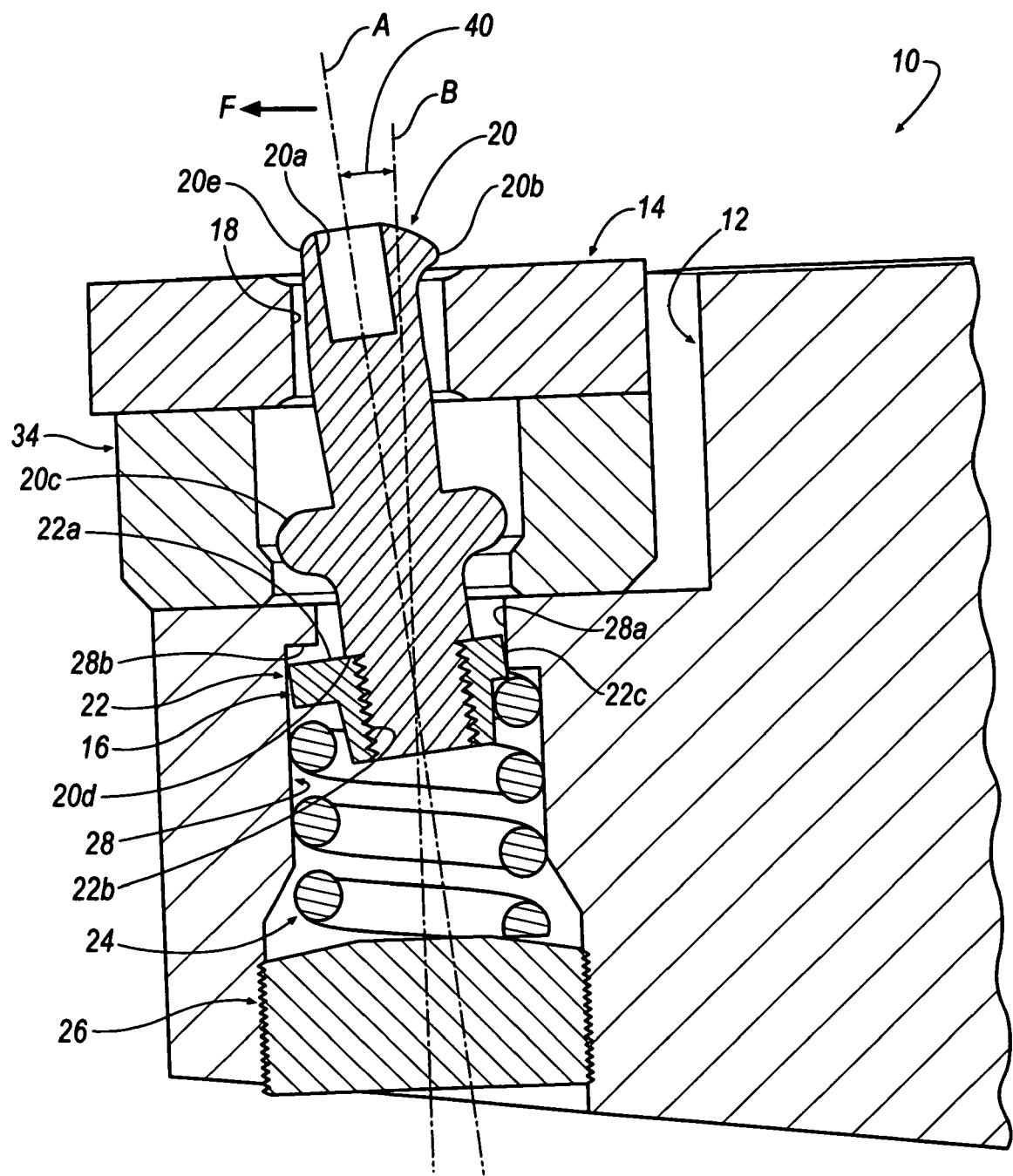
FIG. 3 is a cross-sectional view of the tool holder taken along line 2-2 of FIG. 1 and showing an assembly for retaining the cutting insert in the pocket of the tool holder in a released or unsecured position according to an embodiment of the invention.
Figure 4:
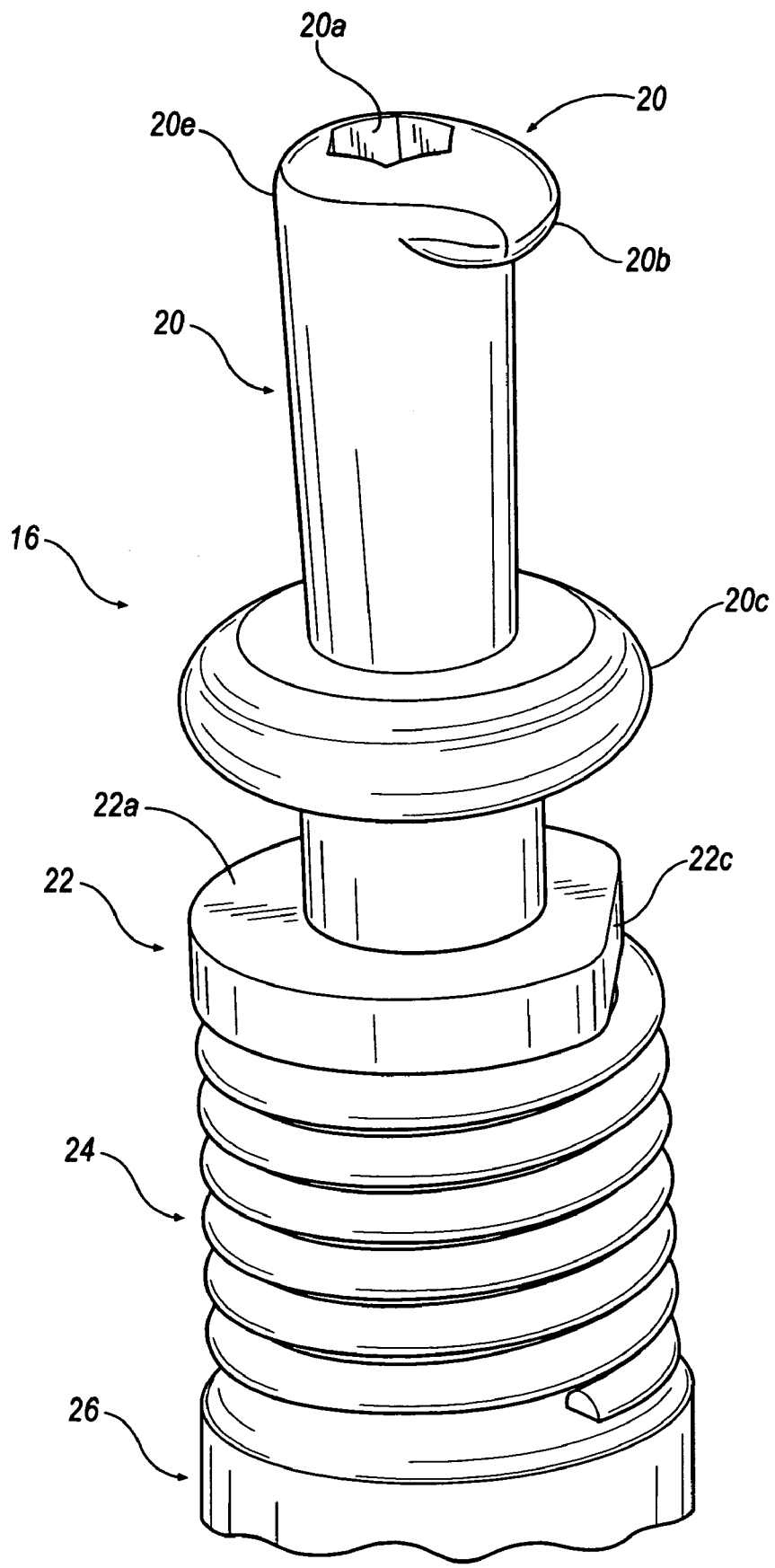
FIG. 4 is a perspective view of an assembly for retaining the cutting insert in the pocket of the tool holder according to an embodiment of the invention.
Figure 5:
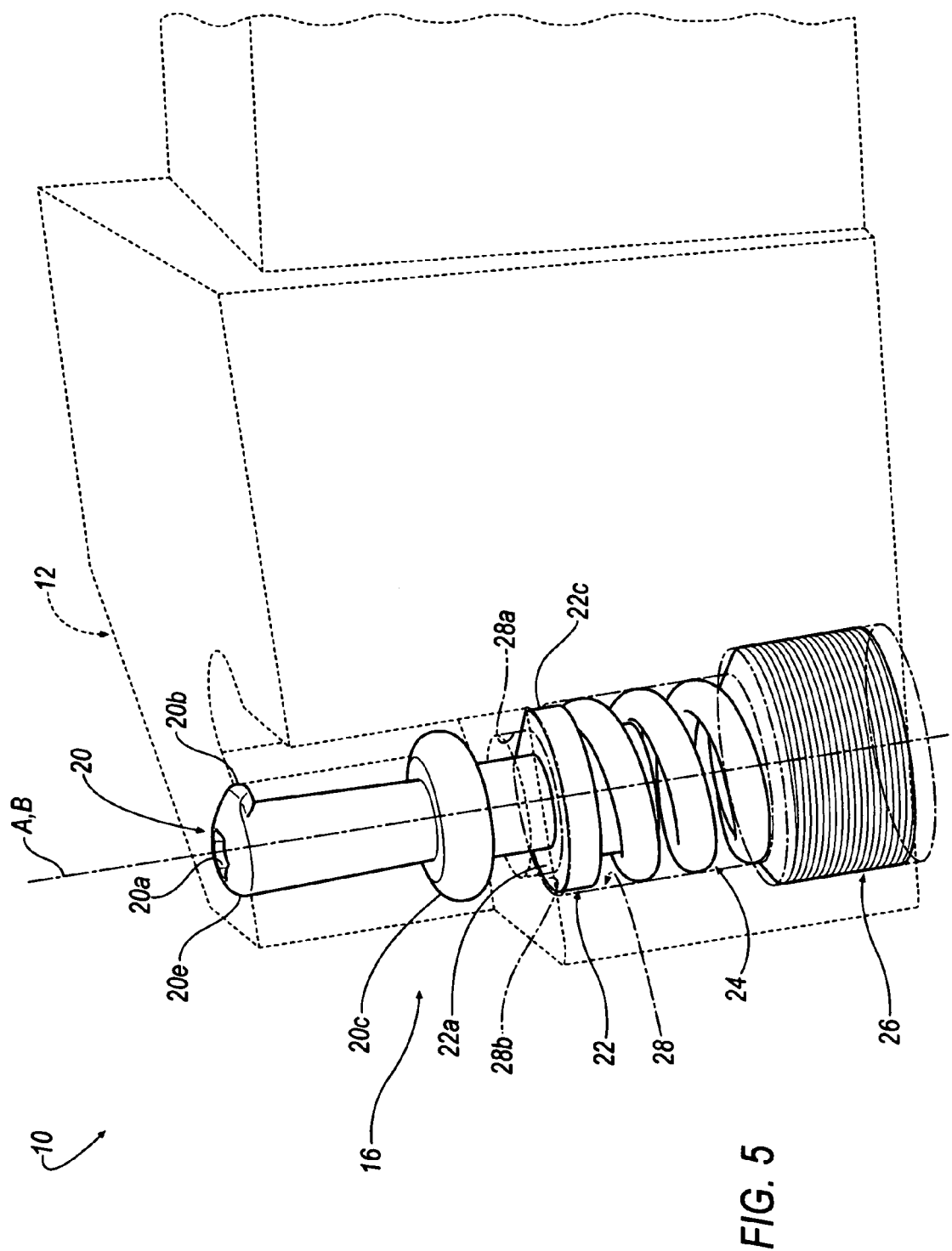
FIG. 5 is a perspective view of the assembly of FIG. 4 with the cutting insert and shim removed for clarity and showing the assembly for retaining the cutting insert within the pocket of the tool holder according to an embodiment of the invention.

Referring now to FIGS. 2-5, the assembly 16, in general, includes a locking pin 20, a locking plate 22, a means 24 for biasing the locking plate 22, such as a spring, and the like, and a set screw 26 for retaining the assembly 10 within the tool holder 10. In FIG. 2, the assembly 16 is a normal position in which spring 24 biases the locking pin 20 and the locking plate 22 to draw the cutting insert 14 against the pocket 12 of the tool holder 10. It will be appreciated that the invention is not limited by the type of biasing means 24 for biasing the locking plate 22 (and, in turn the locking pin 20), and that the invention can be practiced with any desirable biasing means, for example, a wave spring, and the like. When the cutting insert 14 is in the unreleased or secured position as shown in FIG. 2, a longitudinal axis, A, of the assembly 16 is substantially aligned with a longitudinal axis, B, of a bore 20a of the tool holder 10. On the other hand, when the cutting insert 14 is in a released or unsecured position as shown in FIG. 3, a longitudinal axis, A, of the assembly 16 is not substantially aligned with the longitudinal axis, B, of the bore 20a of the tool holder 10.

The head portion of the locking pin 20 includes a socket 20a and an outwardly extending lip 20b. The socket 20a allows the insertion of a tool (not shown) for pivoting the assembly 16 to position the cutting insert 14 in the unreleased or secured position shown in FIG. 2 to a released or unsecured position shown in FIG. 3. The lip 20b engages the top surface of the cutting insert 14 when the cutting insert 14 is in the unreleased or secured position to prevent movement of the cutting insert 14 along the longitudinal axis, A, of the assembly 16. The head portion of the locking pin 20 engages the bore 18 of the cutting insert 14 when the cutting insert 14 is in the unreleased or secured position to draw the cutting insert 14 against the two side walls of the pocket 12.

The shaft portion of the locking pin 20 may include an annular, bulbous portion 20c for engaging an optional shim 34 for the cutting insert 14 when the cutting insert 14 is in the unreleased or secured position to draw the shim 34 against the two side walls of the pocket 12. However, in an embodiment in which the shim 34 is eliminated, the annular, bulbous portion 20c can also be eliminated, and the locking pin 20 can be relatively shorter in length than the locking pin 20 illustrated in the embodiment of the invention.

The shaft portion of the locking pin 20 has a reduced diameter that forms a ledge or seating surface 20d that engages a top surface 22a of the locking plate 22 when the cutting insert 14 is in the unreleased or secured position. The shaft portion of the locking pin 20 is threaded to allow the shaft portion of the locking pin 22 to be threadingly received within a threaded aperture 22b of the locking plate 22.

In the illustrated embodiment, the head portion of the locking plate 22 is substantially circular in cross-sectional shape and has a substantially circular outer diameter, except for a portion that has a faceted or substantially flat surface 22c for engaging a corresponding faceted or substantially flat surface 28a in the bore 20a of the tool holder 10, as shown in FIG. 2. The flat surfaces 22c, 28a act as a key for proper orientation of the assembly 10, as well as to prevent rotation of the locking plate 22 during assembly and operation of the assembly 10.

The top surface 22a of the locking plate 22 engages a ledge 28b of the bore 20a and acts as a stop for the locking plate 22 to prevent further upward movement of the locking plate 22 due to the biasing force exerted by the spring 24. When the top surface 22a of the locking plate 22 engages the ledge 28b, the biasing force from the spring 28 causes the locking pin 20 to draw the cutting insert 14 toward the two side walls of the pocket 12, while simultaneously causing the cutting insert 14 to be drawn downward toward the floor of the pocket 12.

In the illustrated embodiment, the spring 24 comprises a music sire compression spring having an outside diameter of approximately 0.300 inches and a spring diameter of approximately 0.047 inches that produces a maximum load of approximately 15.45 pounds. As seen in FIGS. 2-5, the spring 24 is held in place by the set screw 26 that is threadingly received in bore 28 of the tool holder 10. The set screw 26 serves a dual purpose of 1) retaining the assembly 10 within the bore 28 of the tool holder 10, and 2) selectively adjusting an amount of force exerted by the spring 24 against the locking plate 16. In the illustrated embodiment, the set screw 26 comprises a ⅜"-16 UNC3/16 key, and is made of cup point alloy steel.

Referring now to FIG. 3, to move the assembly 16 to the released, unsecured position from the unreleased, secured position of FIG. 2, a force, F, is applied to the locking pin 20 in the direction of the arrow. The amount of force, F, should be sufficient to overcome the biasing force exerted by the spring 24, and as a result, the spring 24 is slightly compressed such that the top surface 22a of the locking plate 22 no longer engages the ledge 28b of the bore 28. In the released position, the longitudinal axis, A, of the assembly 16 is no longer aligned with the longitudinal axis, B, of the bore 28 and forms an angle 40 thereto. The angle 40 is sufficient to allow the cutting insert 14 and optional shim 34 to be removed from the tool holder 10. For example, the angle 40 may range between approximately 0 degrees and approximately 30 degrees. The top portion of the locking pin 20 may include a chamfered surface 20e located approximately opposite the lip 20b to further assist in the removal of the insert 14 and optional shim 34 from the tool holder 10, if necessary.

To assemble the assembly 10, the locking plate 22 is inserted into the bore 28 of the tool holder 10 at the proper orientation such that the flat surface 22c of the locking plate 22 is aligned with the flat surface 28a of the bore 28. Then, the locking pin 20 is threaded into the locking plate 22 until the top surface 22a of the locking plate 22 engages the ledge or seating surface 20d of the locking pin 20. Next, the spring 24 is inserted into the bottom of the bore 28, and the set screw 26 is threaded into the bore 28 to retain the assembly 10 within the bore 28. The cutting insert 14 and the optional shim 34 can then positioned on the tool holder 10 either before or after the assembly 10 is completed.

Figure 6:
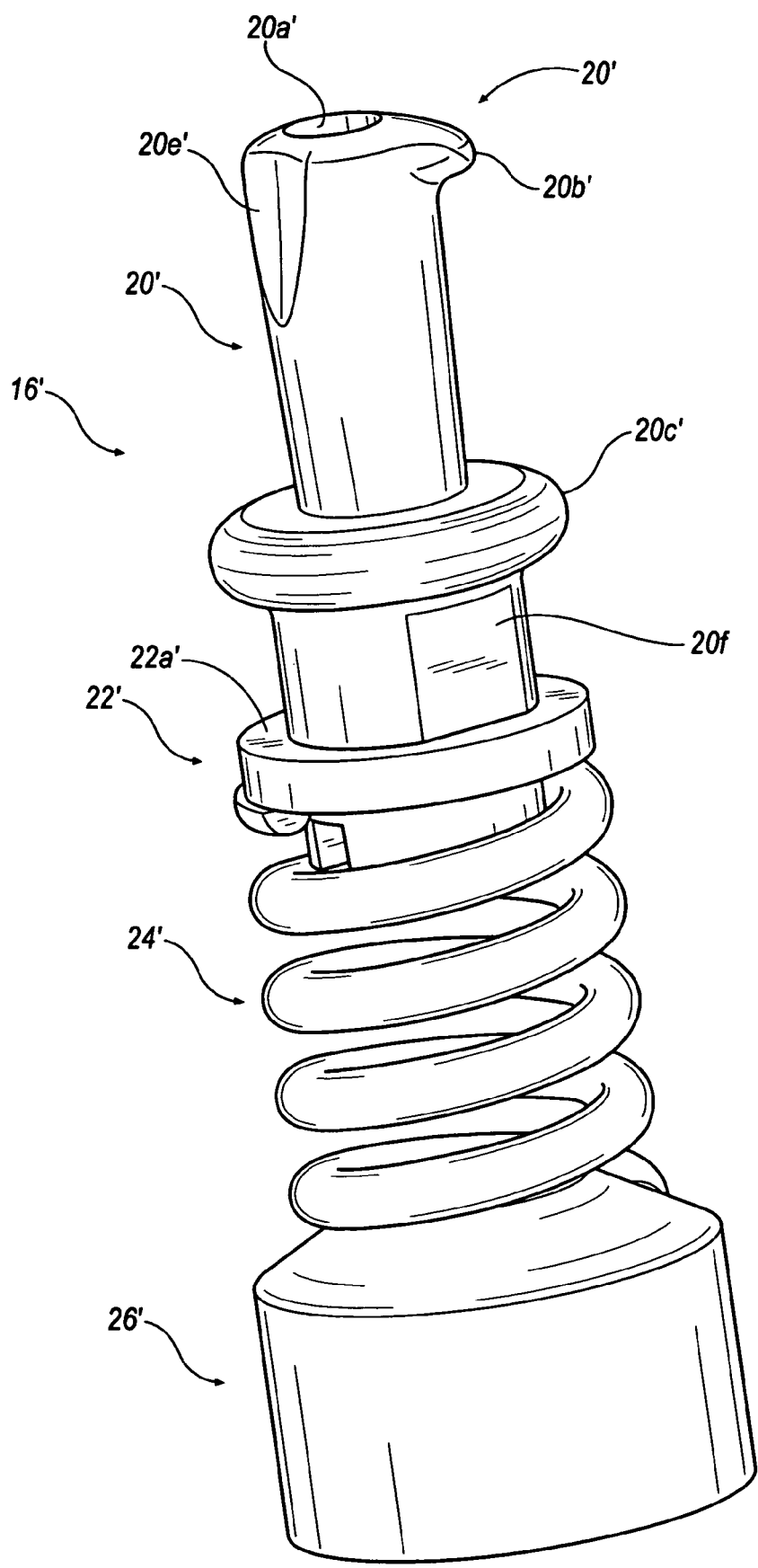
FIG. 6 is a perspective view of an assembly for retaining the cutting insert in the pocket of the tool holder according to another embodiment of the invention.
Figure 7:
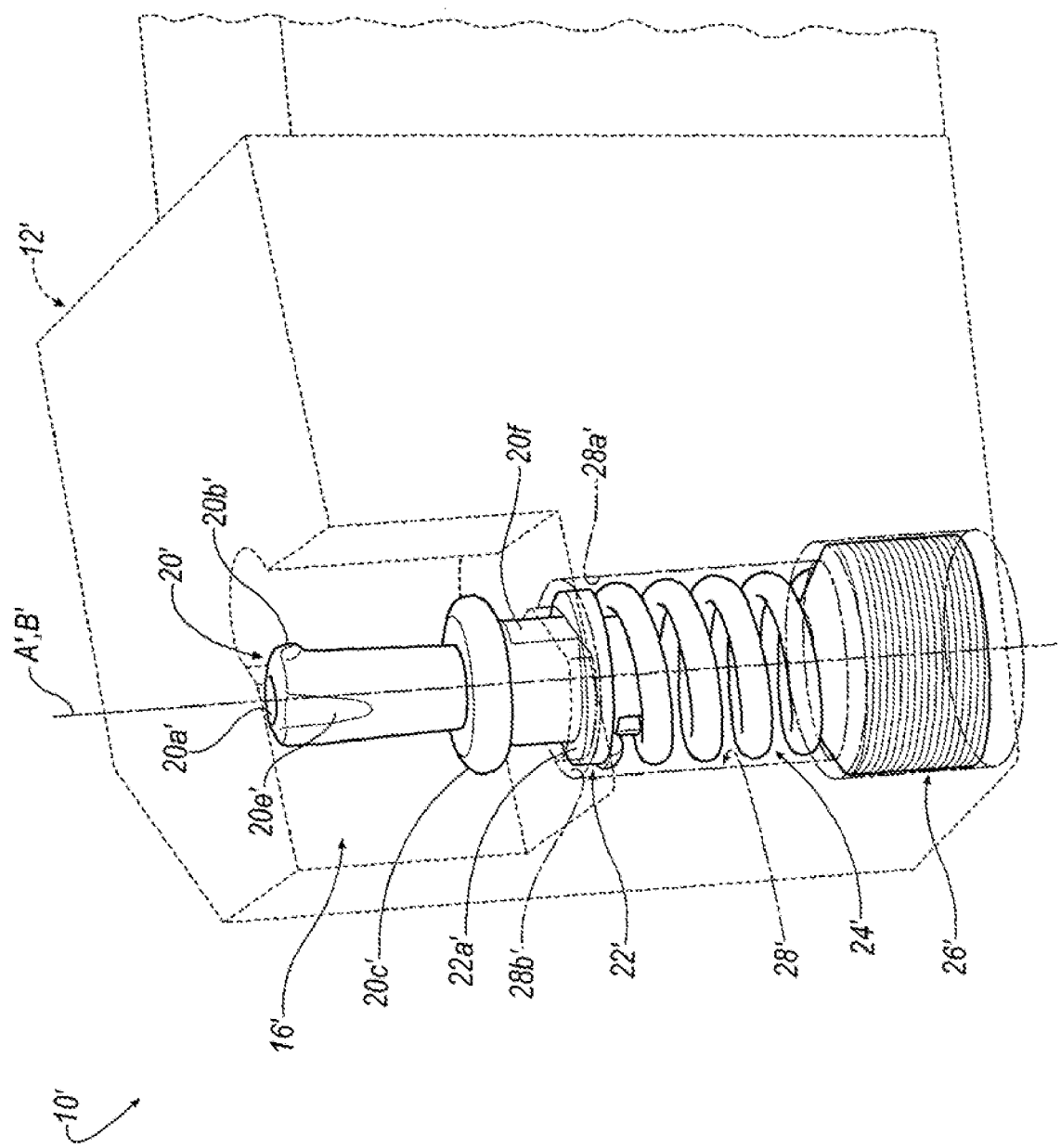
FIG. 7 is a perspective view of the assembly of FIG. 6 with the cutting insert and shim removed for clarity and showing the assembly for retaining the cutting insert within the pocket of the tool holder according to an embodiment of the invention.

It will be appreciated that the invention is not limited by the location of the flat surfaces that interact with each other to act as a key device and also to prevent rotation of the locking pin 20 and locking plate 22. Referring now to FIGS. 6 and 7, another embodiment of an assembly 16' is shown. The assembly 16' includes a locking pin 20', a locking plate 22', the spring 24 and the set screw 26. The locking pin 20' is substantially similar to the locking pin 20, except that the shaft portion of the locking pin 20' also includes a faceted or a substantially flat surface 20f that cooperates with the faceted or substantially flat surface 28a' of the bore 28. In this manner, the substantially flat surface 20f of the locking pin 20' acts as a key device and also prevent rotation of the locking pin 20'. In this embodiment, the substantially flat surface 22c of the locking plate 22 is no longer needed and is eliminated in the locking plate 22'. Otherwise, the locking plate 22' is substantially similar to the locking plate 22.

To assemble the assembly 16', the locking plate 22' is inserted into the bore 28 of the tool holder 10 while the locking pin 20' is slightly threaded into the locking plate 22'. Then, the locking pin 20' and locking plate 22' is located at the proper orientation using the key device (flat surfaces 20f and 28a). Next, the locking plate 22' is completely threaded on to the locking pin 20'. Then, the spring 24 is inserted into the bottom of the bore 28 and the set screw 26 is threaded into the tool holder 10.

As described above, the assembly 10, 10' in its normal position positively secures the cutting insert 14 within the pocket 12 of the tool holder 10, while allowing the insert 14 to be easily released from the secured position and removed from the tool holder 10 by simply applying a force to counteract the biasing force of the spring 24. In addition, the assembly 10 can be assembly quickly and easily, as compared to conventional clamp assemblies.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An assembly for retaining a cutting insert in a pocket of a tool holder, the tool holder including a bore having a ledge formed therein, the assembly comprising:
   a locking pin at least partially disposed in one end of the bore of the tool holder;
   a spring disposed in the bore of the tool holder;
   a locking plate disposed in the bore of the tool holder between the spring and the locking pin; and
   a set screw at least partially disposed in an opposite end of the bore of the tool holder,
   wherein the locking plate is biased against the ledge of the bore to cause the locking pin to draw and retain the cutting insert in a direction such that the cutting insert is held in a secured position against the pocket of the tool holder.

2. The assembly according to claim 1, wherein the locking plate includes a substantially flat surface for engaging a substantially flat surface of the bore to act as a key for proper orientation of the assembly.

3. The assembly according to claim 1, wherein the locking pin includes a substantially flat surface for engaging a substantially flat surface of the bore to act as a key for proper orientation of the assembly.

4. The assembly according to claim 1, wherein the locking pin further comprises a head portion and a shaft portion.

5. The assembly according to claim 4, further comprising a lip extending outwardly from the head portion, wherein the lip engages a top surface of the cutting insert when the assembly is in the secured position.

6. The assembly according to claim 1, wherein the locking pin includes an annular, bulbous portion for engaging a shim when the assembly is in the secured position.

7. An assembly for retaining a cutting insert in a pocket of a tool holder, the tool holder including a bore having a ledge formed therein, the assembly comprising:
   a locking pin at least partially disposed in the bore of the tool holder;
   means for biasing the locking plate; and
   a locking plate disposed in the bore of the tool holder between the biasing means and the locking pin; and
   a set screw at least partially disposed in an opposite end of the bore of the tool holder,
   wherein the locking plate is biased against the ledge of the bore to cause the locking pin to draw and retain the cutting insert in a direction such that the cutting insert is held in a secured position against the pocket of the tool holder.

8. The assembly according to claim 7, wherein the locking plate includes a substantially flat surface for engaging a substantially flat surface of the bore to act as a key for proper orientation of the assembly.

9. The assembly according to claim 7, wherein the locking pin includes a substantially flat surface for engaging a substantially flat surface of the bore to act as a key for proper orientation of the assembly.

10. The assembly according to claim 7, wherein the locking pin further comprises a head portion and a shaft portion.

11. The assembly according to claim 10, further comprising a lip extending outwardly from the head portion, wherein the lip engages a top surface of the cutting insert when the assembly is in the secured position.

12. The assembly according to claim 7, wherein the locking pin includes an annular, bulbous portion for engaging a shim when the assembly is in the secured position.

13. A tool holder including a bore having a ledge formed therein, comprising
   a locking pin at least partially disposed in the bore of the tool holder;
   a spring for biasing the locking plate;
   a locking plate disposed in the bore of the tool holder between the spring and the locking pin; and
   a set screw threadably received in the bore of the tool holder,
   wherein the locking plate is biased against the ledge of the bore to cause the locking pin to draw and retain a cutting insert in a direction such that the cutting insert is held in a secured position against a pocket of the tool holder.

14. The assembly according to claim 13, wherein the locking plate includes a substantially flat surface for engaging a substantially flat surface of the bore to act as a key for proper orientation of the assembly.

15. The assembly according to claim 13, wherein the locking pin includes a substantially flat surface for engaging a substantially flat surface of the bore to act as a key for proper orientation of the assembly.

16. The assembly according to claim 13, wherein the locking pin further comprises a head portion and a shaft portion.

17. The assembly according to claim 16, further comprising a lip extending outwardly from the head portion, wherein the lip engages a top surface of the cutting insert when the assembly is in the secured position.

18. The assembly according to claim 13, wherein the locking pin includes an annular, bulbous portion for engaging a shim when the assembly is in the secured position.

* * * * *